(12) United States Patent
Addy

(10) Patent No.: US 6,619,055 B1
(45) Date of Patent: Sep. 16, 2003

(54) SECURITY SYSTEM WITH WIRELESS THERMOSTAT AND METHOD OF OPERATION THEREOF

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/103,177

(22) Filed: Mar. 20, 2002

(51) Int. Cl.$^7$ .............................. G05D 23/00; F23N 5/20
(52) U.S. Cl. ...................... 62/126; 236/46 R; 236/51; 340/870.17
(58) Field of Search ................................. 236/51, 46 R, 236/94; 340/870.17

(56) References Cited

U.S. PATENT DOCUMENTS

| | | | |
|---|---|---|---|
| 5,272,477 A | * 12/1993 | Tashima et al. | 340/870.16 |
| 5,927,599 A | 7/1999 | Kath | 236/47 |
| 6,053,001 A | * 4/2000 | Nunokawa et al. | 62/230 |
| 6,116,512 A | 9/2000 | Dushane et al. | 236/51 |
| 6,394,359 B1 | * 5/2002 | Morgan | 236/51 |

* cited by examiner

Primary Examiner—William Wayner
(74) Attorney, Agent, or Firm—Anthony R. Barkumf, P.C.

(57) ABSTRACT

A security system and method includes a control panel, a security RF receiver connected to the control panel, an air temperature controller unit (e.g. a furnace and/or an air conditioner) including an air temperature controller RF receiver for receiving RF signals to control its operation, and a wireless thermostat having a unique thermostat identification indicia associated therewith. The thermostat has a thermostat RF transmitter configured to transmit air temperature control signals to the air temperature controller unit via the air temperature controller RF receiver to control its operation in accordance with a preprogrammed air temperature profile. The security system control panel is adapted to receive and monitor signals transmitted from the thermostat RF transmitter and generate a thermostat warning signal under certain preprogrammed conditions. The control panel monitors either or both of (1) the air temperature control signals transmitted by the thermostat RF transmitter or (2) periodic supervision signals in order to determine if a thermostat warning signal should be generated. Remote control of the air temperature controller is enabled by using a remote control device with an RF transmitter for communicating directly with the air temperature controller RF receiver. Also, a security RF transmitter may send control signals directly to the air temperature controller RF receiver without the need to use the wireless thermostat.

37 Claims, 1 Drawing Sheet

Order # SECURITY SYSTEM WITH WIRELESS THERMOSTAT AND METHOD OF OPERATION THEREOF

BACKGROUND OF THE INVENTION

The present invention relates to security systems and in particular to the integration of the remote reporting and control functions of a security system with a wireless thermostat and a heating and air conditioning control system to provide remote reporting and control of that system.

Wireless thermostats are used to allow thermostat control of a heating and air conditioning system in a home or business without having to run wires from the thermostat to the air control unit. Typically, these wireless thermostats include an RF transmitter for controlling the air control unit. RF remote control of a wireless thermostat is difficult because the thermostats are battery powered, and the batteries would drain quickly if it were to be continuously receiving, or even receiving at low duty cycle. Even if the power problem could be ameliorated, the addition of a receiver at the thermostat would result in a significant additional cost. Therefore, it would be desired to be able to provide remote RF control of the heating and air conditioning systems without requiring the thermostat to have an RF receiver.

Security systems presently in use often provide the user with remote control and reporting functions. Typically, a home security system will include a remote dialer device, which is connected to the system control panel and which is adapted to dial a central station whenever an alarm condition is detected by the system (such as when a motion sensor is triggered, for example).

It is desired to be able to utilize the remote control and reporting capabilities of a security system for allowing remote reporting and control of an air temperature control system(s) such as a furnace and/or an air conditioning unit.

SUMMARY OF THE INVENTION

The present invention is a security system and method of operation thereof that includes a control panel, an RF receiver connected to the control panel, an air temperature controller unit such as a furnace or an air conditioning unit that includes an RF receiver for receiving RF signals to control its operation, and a wireless thermostat which includes an RF transmitter configured to transmit air temperature control signals to the air temperature controller unit to control its operation in accordance with a preprogrammed air temperature profile. The control panel is adapted to receive and monitor signals transmitted from the thermostat RF transmitter and generate a thermostat warning signal under certain preprogrammed conditions. For example, the control panel can monitor the air temperature control signals transmitted by the thermostat RF transmitter to determine if a thermostat warning signal should be generated, or the thermostat may be programmed to generate periodic thermostat supervision signals for transmission to the control panel, in which case the control panel monitors the thermostat supervision signals transmitted by the thermostat RF transmitter to determine if a thermostat warning signal should be generated.

A thermostat warning signal may be generated by the control panel on the failure to receive any thermostat signals (supervision or control) over a certain period of time, or if a supervision signal is received that indicates a fault such as a low battery condition or an excessively low or high ambient air temperature. A central station interface module may be connected to the control panel for establishing communications with a central station when requested by the control panel, such that the control panel is adapted to cause the central station interface module to dial up a central station when a thermostat warning signal has been generated.

A thermostat identification indicia is programmed into a device ID table associated with the control panel and into control logic associated with the air temperature control unit; the control panel and the air temperature control unit are thus both adapted to receive and process signals transmitted by the thermostat RF transmitter.

An RF transmitter may be connected to the control panel and is adapted to communicate with the air temperature controller RF receiver; then the control logic associated with the air temperature control unit must be programmed with an identification indicia of that RF transmitter, and then the control panel may also be adapted to send air temperature control signals to the air temperature control unit to control its operation.

A user remote control device may also be implemented; an operator of the user remote control device can transmit remote control signals to control operation of the air temperature controller unit directly or via the security system.

DETAILED DESCRIPTION OF THE PREFERRED EMBODIMENT

Figure 1:
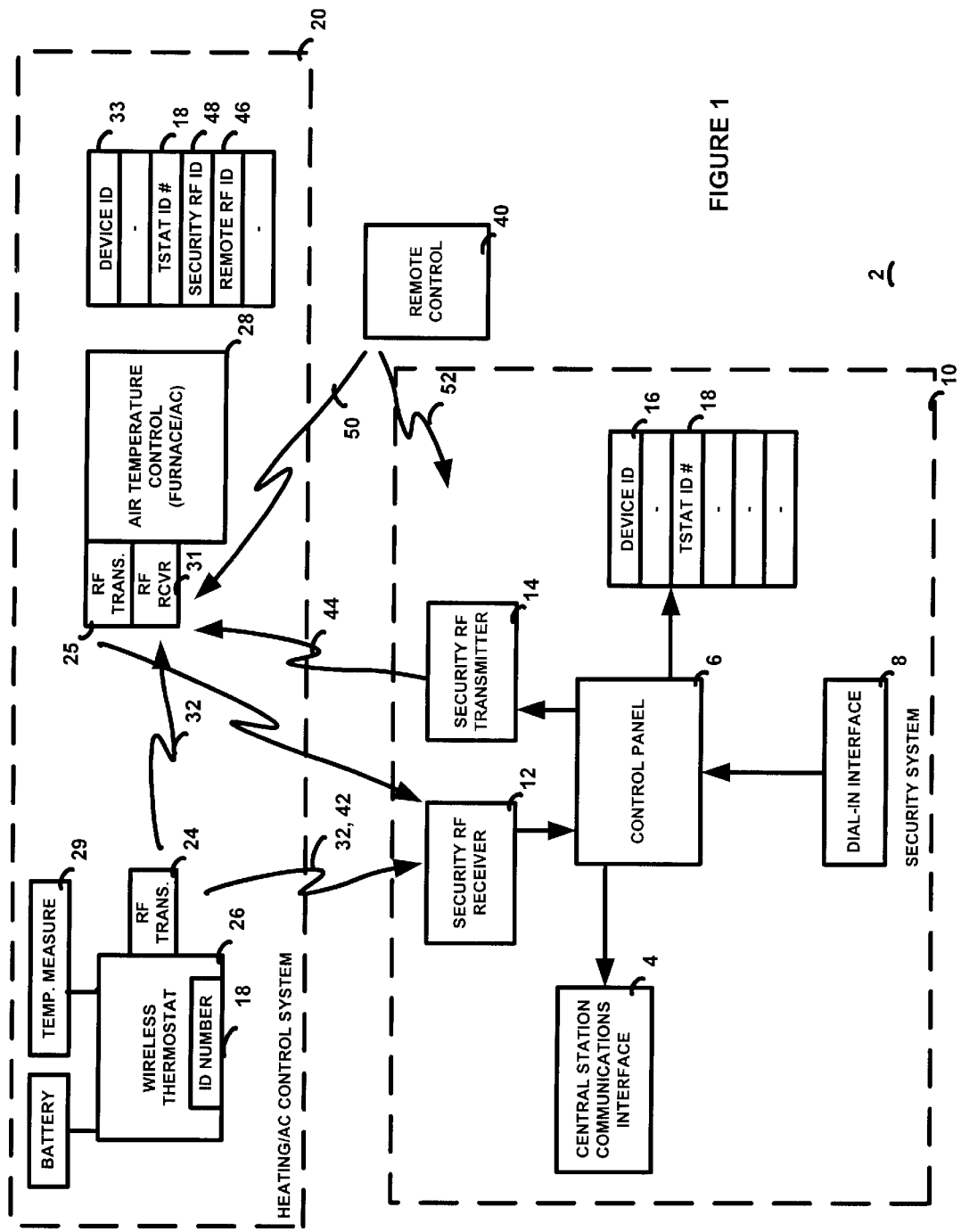
FIG. 1 is a block diagram of the preferred embodiment of the present invention.

Referring to FIG. 1, the system 2 of the present invention will now be described with respect to uts method of operation. A security subsystem 10 is shown, which includes several components known in the security system arts, such as a control panel 6, a central station communications interface 4, an RF receiver 12, and an RF transmitter 14, all of which are interconnected by a bus connection or other type of means well known in the art. The security system 10 also includes various alarm devices such as PIR sensors, microwave detectors, smoke alarms, glass break detectors, etc., which are well known in the art and not shown here for purposes of clarity. These alarm devices provide alarm signals to the control panel 6 when they are triggered, and the control panel determines if an alarm condition truly exists and then takes an action such as requesting the central station communications interface 4 to dial a central station monitoring system (or sounding a local siren, not shown). The central station will take subsequent action as well known in the art, for example by telephoning the homeowner to confirm the alarm condition, dispatching police or fire personnel, etc.

Also shown in FIG. 1 is a device ID table 16, which is a list of identification numbers of devices that have been learned or registered in the system control panel during an installation phase. Once learned, the control panel is enabled to communicate with that device at subsequent times. If the control panel has not learned a device, it will refuse communications when that device attempts to communicate with the control panel.

FIG. 1 also illustrates the heating/AC control system 20 of the present invention. An air temperature control unit 28 is shown, which may be an air conditioner and/or a furnace or other type of air temperature control system known in the art. An RF receiver 31 is connected to the air temperature control unit 28 to allow communication from a wireless thermostat 26. The wireless thermostat 26 is in communication with the air temperature control unit 28 via air temperature control signals 32 to turn it on or off as required. The wireless thermostat 26 of the present invention also includes an RF transmitter 24 which operates to provide wireless communications to the RF receiver 31 and thereby control operation of the air temperature control unit 28. As well known in the art, the thermostat includes a temperature measuring unit 29 such as a thermistor that measures the ambient air temperature, and the wireless thermostat 26 compares it to a preprogrammed profile. If the air is too hot, it may turn off the furnace and/or turn on the air conditioner; conversely, if the air is too cold, it will do the opposite, all via transmission of appropriate air temperature signals 32.

The thermostat is programmed with its own unique identification number 18, which is programmed or learned into a device ID table 33 associated with the air temperature control unit 28 during an installation mode as well known in the art. (The number is unique with respect to the system in which it is installed, it may of course be repeated in a device in a different system). In accordance with the present invention, the thermostat identification number 18 is also learned into the device ID table 16 associated with the control panel 6 so that the control panel may monitor the operation of the wireless thermostat 26 as will now be described.

During operation of the system 2, the wireless thermostat generates air temperature control signals from time to time; i.e. as required in order to keep the ambient air temperature at the preprogrammed profile. In addition to these signals being received by the RF receiver 31 and acted on by the air temperature control unit 28, the security system 10 is able to monitor these signals since the thermostat ID 18 has been previously learned by the control panel 6 and stored in its device ID table 16. Thus, the control panel will be able to determine that the thermostat is "alive" by recognizing the air temperature control signals 32 it transmits on occasion (which may be as often as every half hour or so). The control panel is programmed to ascertain if the wireless thermostat may be inoperative (e.g. a dead battery) when it has not monitored any transmissions by the RF transmitter 24 for a long period of time (e.g. 6 hours). The control panel may then generate a thermostat warning signal to indicate the likely failure of the thermostat.

In an alternative embodiment, the present invention also provides for the wireless thermostat 26 to periodically generate a supervision signal 42 that will be transmitted by the RF transmitter 24 periodically regardless of whether the air temperature profile requires control of the air temperature control unit. This embodiment would be more accurate than simply monitoring the air temperature control signals 32 sent by the RF transmitter 24, since certain temperature conditions might not call for an adjustment of the air temperature controller 28 for a long time, and the control panel could erroneously conclude that the wireless thermostat 26 is inoperative and unnecessarily issue a warning signal. By periodically sending supervision signals, for example every five minutes, the control panel could correctly conclude an inoperative thermostat exists when it doesn't receive any supervision signals for a given period of time. In addition, a supervision signal may include thermostat status data, which would include a battery status data, temperature data, etc. This would give the control panel a more accurate assessment of the system operation, and would enable it to generate more accurate warning signals.

Thus, for example, even if the thermostat is working properly, the determination that the temperature is dropping to below a predetermined threshold (for example 50° F.) would indicate that the furnace is inoperative and provide a more useful warning signal.

The control panel will operate on the receipt of the low temperature status condition (or any other warning signal) in a preprogrammed manner, for example by initiating a dial sequence in the central station communications interface 4 to inform the central station of this trouble condition. A repairman could then be dispatched immediately to repair the problem and avoid damage to the premises, such as water damage from freezing/burst pipes. The dialer could also be programmed to call a cell phone or pager of the homeowner and issue a low temperature warning directly.

The air temperature control unit 28 may also have an air temperature controller RF transmitter 25 for issuing RF data transmissions as required. The RF transmitter 25 may generate and send periodic supervision signals (received by the security RF receiver 12) so that the control panel 6 can confirm whether the air temperature control unit 28 is operative. These supervision signals may contain status information to provide the control panel 6 with information appropriate to make such confirmation. In such case, the ID number of the RF transmitter 25 will also be stored in the device ID table 16 as well known in the art.

As an additional feature of the present invention, the security system 10 may be configured to communicate directly with the air temperature control unit 28 to affect its operation without using the wireless thermostat 24. The RF transmitter 14 is caused to send control signals 44 that are compatible with those normally issued by the wireless thermostat, and the RF receiver 31 receives them for processing by the air temperature control unit 28. The device ID table 33 must be preprogrammed with the ID 48 of the Rf transmitter 14 in order to establish communications. Thus, for example, if the control panel determines that the temperature has dropped too low, it may try to turn on the furnace by sending an appropriate control signal 44 directly to the RF receiver 31. If the cause of the low temperature is the failure of the wireless thermostat (meaning that the furnace is likely operative), then this procedure will cause the furnace to turn on and prevent a disaster from occurring in the premises. (If of course the cause of the low temperature is a failed furnace, then this will not remedy the problem). In either event, a repairman may be dispatched to fix the problem by telephoning the central station as previously described.

In addition, an additional remote RF ID number 46 may be stored in the device table 33 at the air temperature control unit 28 to allow the user to directly communicate with the furnace via an RF remote control by sending control signals 50. This embodiment would allow a user to keep a small RF remote control 40 on his person, such as a keyfob unit, and turn on (or off) the furnace (or air conditioner) if he/she desires, without having to walk to the location of the thermostat and press a control button there. The control signals 50 might also be routed to the air temperature control unit 28 via the security system 10 in addition to the direct communications just described.

An additional feature of the present invention is to provide for direct communications between an existing security device and the air temperature controller RF receiver 31. For example, an open window detector (such as a magnetic closure device) with an RF transmitter may broadcast a message that a window has been left open, and the air temperature control unit 28 would as a result refrain from turning on the air conditioner in the summer, even if called for by the thermostat 26 (to prevent waste of the cooling system).

A dial-in interface 8 is also connected to the control panel 6 and allows a user to remotely control the operation of the security system 10, for example by using a telephone to dial-in and pressing the keys of the telephone keypad to transmit DTMF tones, which can be programmed to signal to the control panel certain actions to be taken. The present invention allows the user to telephone the dial-in interface and obtain status of the thermostat, such as the current temperature. This is accomplished by depressing a series of keys on the telephone keypad, which generates DTMF tones as known in the art, which can then be used to read thermostat status via the supervision data. In addition, remote operation of the air temperature control unit 28 is possible via the security system 10, which would send control signals 44 as previously described.

The remote interfaces 4 and 8 have been described herein as dial-up or dial-in interfaces, which is of course the simple case of a telephone connection. In addition to the telephone connection, the present invention may implement any type of remote communications methodology known in the art, for example, a long range radio interface may also be implemented for communicating with the central station. In addition, with the ubiquity of the Internet, it is envisioned that an Internet connection (dial-up, cable modem, or any other type) could be used as well, where an http request or other type of Internet protocol may be used to transfer data to a web site run by the central station. Likewise, the dial-in interface 8 could be implemented as a web server running on a local host on the premises, which would interface with the control panel and allow a remote user to access a web page that provides status data as well as input fields for issuing commands to the system.

Although the invention has been shown and described with respect to best mode embodiments thereof, it should be understood by those skilled in the art that the foregoing and various other changes, omissions and additions in the form and detail thereof may be made therein without departing from the spirit and scope of the invention.

What is claimed is:

1. A security system comprising:
   a) a control panel;
   b) a security RF receiver connected to the control panel;
   c) an air temperature controller unit comprising an air temperature controller RF receiver for receiving RF signals to control its operation; and
   d) a wireless thermostat having a unique thermostat identification indicia associated therewith, comprising a thermostat RF transmitter configured to transmit air temperature control signals to the air temperature controller unit via the air temperature controller RF receiver to control its operation in accordance with a preprogrammed air temperature profile;
   wherein the control panel is adapted to receive and monitor signals transmitted from the thermostat RF transmitter and generate a thermostat warning signal under certain preprogrammed conditions.

2. The security system of claim 1 wherein the control panel monitors the air temperature control signals transmitted by the thermostat RF transmitter to determine if a thermostat warning signal should be generated.

3. The security system of claim 1 wherein the thermostat is programmed to generate periodic thermostat supervision signals for transmission to the control panel.

4. The security system of claim 3 wherein the control panel monitors the thermostat supervision signals transmitted by the thermostat RF transmitter to determine if a thermostat warning signal should be generated.

5. The security system of claim 3 wherein the thermostat supervision signals comprise thermostat status data.

6. The security system of claim 5 wherein the thermostat status data comprises an indication of thermostat battery condition.

7. The security system of claim 6 wherein the thermostat warning signal is generated when the battery condition is indicated to be below a predetermined threshold.

8. The security system of claim 5 wherein the thermostat status data comprises air temperature data.

9. The security system of claim 6 wherein the thermostat warning signal is generated when the air temperature data exceeds or falls below a predetermined threshold.

10. The security system of claim 1 further comprising a central station interface module connected to the control panel for establishing communications with a central station when requested by the control panel, wherein the control panel is adapted to cause the central station interface module to establish communications with a central station when a thermostat warning signal has been generated.

11. The security system of claim 1 wherein the wireless thermostat comprises:
    air temperature measurement means for measuring the air temperature of the air surrounding the thermostat; and
    air temperature control signal generation means for generating an air temperature control signal for controlling an associated air temperature control unit.

12. The security system of claim 1 wherein the thermostat identification indicia is programmed into (i) a device ID table associated with the control panel and (ii) control logic associated with the air temperature control unit; whereby the control panel and the air temperature control unit are both adapted to receive and process signals transmitted by the thermostat RF transmitter.

13. The security system of claim 1 further comprising a security RF transmitter connected to the control panel and adapted to communicate with the air temperature controller RF receiver, the control logic associated with the air temperature control unit further programmed with an identification indicia of the security RF transmitter, wherein the control panel is further adapted to send air temperature control signals via the security RF transmitter to the air temperature control unit to control the operation thereof.

14. The security system of claim 13 further comprising a user remote control device comprising a remote RF transmitter, wherein an operator of the user remote control device can transmit remote control signals to control operation of the air temperature controller unit.

15. The security system of claim 14 wherein the remote RF transmitter sends remote control signals directly to the air temperature controller RF receiver, and wherein the control logic associated with the air temperature control unit is further programmed with an identification indicia of the remote RF transmitter.

16. The security system of claim 14 wherein the remote RF transmitter sends remote control signals to the control panel, and wherein the control panel as a result causes remote control operation of the air temperature control unit via the security RF transmitter.

17. The security system of claim 1 wherein the air temperature control unit is a furnace for heating air.

18. The security system of claim 1 wherein the air temperature control unit is an air conditioner unit for cooling air.

19. The security system of claim 1 further comprising user input interface means for allowing a user to input control data via a remote connection; the control data being adapted to be transmitted by the control panel to the air temperature controller RF receiver via the security RF transmitter to effect control thereover; whereby a user can remotely control the operation of the air temperature control unit by a remote connection.

20. A method for operating a method comprising a control panel, a security RF receiver connected to the control panel, an air temperature controller unit comprising an air temperature controller RF receiver for receiving RF signals to control its operation, and a wireless thermostat having a unique thermostat identification indicia associated therewith, comprising a thermostat RF transmitter configured to transmit air temperature control signals to the air temperature controller unit via the air temperature controller RF receiver to control its operation in accordance with a preprogrammed air temperature profile; comprising the steps of:

the control panel receiving signals including the thermostat identification indicia transmitted from the thermostat RF transmitter via the security RF receiver, the control panel determining that it is configured to operate with the thermostat identification indicia received;

the control panel monitoring activity of said signals, and the control panel generating a thermostat warning signal under certain preprogrammed conditions of said signals.

21. The method of claim 20 wherein the control panel monitors the air temperature control signals transmitted by the thermostat RF transmitter to determine if a thermostat warning signal should be generated.

22. The method of claim 20 further comprising the step of the thermostat generating periodic thermostat supervision signals for transmission to the control panel.

23. The method of claim 22 further comprising the step of the control panel monitoring the thermostat supervision signals transmitted by the thermostat RF transmitter to determine if a thermostat warning signal should be generated.

24. The method of claim 22 wherein the thermostat supervision signals comprise thermostat status data.

25. The method of claim 24 wherein the thermostat status data comprises an indication of thermostat battery condition.

26. The method of claim 25 wherein the thermostat warning signal is generated when the battery condition is indicated to be below a predetermined threshold.

27. The method of claim 24 wherein the thermostat status data comprises air temperature data.

28. The method of claim 25 wherein the thermostat warning signal is generated when the air temperature data exceeds or falls below a predetermined threshold.

29. The method of claim 20 in which the security system further comprises a central station interface module connected to the control panel for establishing communications with a central station when requested by the control panel, further comprising the step of the control panel causing the central station interface module to establish communications with a central station when a thermostat warning signal has been generated.

30. The method of claim 20 wherein the thermostat identification indicia is programmed into (i) a device ID table associated with the control panel and (ii) control logic associated with the air temperature control unit; whereby the control panel and the air temperature control unit are both adapted to receive and process signals transmitted by the thermostat RF transmitter.

31. The method of claim 20 further in which the security system further comprises a security RF transmitter connected to the control panel and adapted to communicate with the air temperature controller RF receiver, the control logic associated with the air temperature control unit further programmed with an identification indicia of the security RF transmitter, wherein the control panel is further adapted to send air temperature control signals via the security RF transmitter to the air temperature control unit to control the operation thereof.

32. The method of claim 31 in which the security system further comprises a user remote control device comprising a remote RF transmitter, wherein an operator of the user remote control device can transmit remote control signals to control operation of the air temperature controller unit.

33. The method of claim 32 wherein the remote RF transmitter sends remote control signals directly to the air temperature controller RF receiver, and wherein the control logic associated with the air temperature control unit is further programmed with an identification indicia of the remote RF transmitter.

34. The method of claim 32 wherein the remote RF transmitter sends remote control signals to the control panel, and wherein the control panel as a result causes remote control operation of the air temperature control unit via the security RF transmitter.

35. The method of claim 20 wherein the air temperature control unit is a furnace for heating air.

36. The method of claim 20 wherein the air temperature control unit is an air conditioner unit for cooling air.

37. The method of claim 20 in which the security system further comprises user input interface means for allowing a user to input control data via a remote connection; the control data being adapted to be transmitted by the control panel to the air temperature controller RF receiver via the security RF transmitter to effect control thereover; whereby a user can remotely control the operation of the air temperature control unit by a remote connection.

* * * * *